United States Patent [19]

Satou et al.

[11] Patent Number: 5,260,165

[45] Date of Patent: Nov. 9, 1993

[54] OPTICAL INFORMATION RECORDING MEDIUM

[75] Inventors: Tsutomu Satou; Keiko Ichinose, both of Yokohama, Japan

[73] Assignee: Ricoh Company, Ltd., Tokyo, Japan

[21] Appl. No.: 664,551

[22] Filed: Mar. 4, 1991

[30] Foreign Application Priority Data

Mar. 6, 1990 [JP] Japan .................. 2-54617

[51] Int. Cl.$^5$ .............. G03C 1/00; G11B 7/24
[52] U.S. Cl. ................... 430/271; 430/495; 430/945; 369/284; 369/288
[58] Field of Search ............ 430/495, 945, 281; 346/135.1; 369/284, 288

[56] References Cited

U.S. PATENT DOCUMENTS

| | | | |
|---|---|---|---|
| 4,090,031 | 5/1978 | Russell | 346/135.1 |
| 4,195,312 | 3/1980 | Bell et al. | 346/135.1 |
| 4,270,132 | 5/1981 | Bell | 430/945 |
| 4,432,002 | 2/1984 | Ando | 346/135.1 |
| 4,547,876 | 10/1985 | Ettenberg | 346/135.1 |
| 4,587,533 | 5/1986 | Nakane et al. | 369/283 |
| 4,625,217 | 11/1986 | Spang et al. | 346/135.1 |
| 4,639,745 | 1/1987 | Matsui et al. | 346/135.1 |
| 4,696,892 | 9/1987 | Abe et al. | 346/135.1 |
| 4,767,693 | 8/1988 | Oba et al. | 430/495 |
| 4,917,989 | 4/1980 | Albert et al. | 430/495 |
| 4,944,967 | 7/1990 | Yabe et al. | 430/945 |
| 4,946,724 | 8/1990 | Shingaki et al. | 369/284 |
| 4,977,064 | 12/1990 | Sukawa et al. | 430/495 |
| 5,002,812 | 3/1991 | Umehara et al. | 430/270 |
| 5,019,476 | 5/1991 | Kanno et al. | 430/495 |

FOREIGN PATENT DOCUMENTS 58-112794 9/1983 Japan .

OTHER PUBLICATIONS

CRC Handbook of Chemistry & Physics p. B-143 (1982-83 ed.).

*Primary Examiner*—Charles L. Bowers, Jr.
*Assistant Examiner*—Martin Angebranndt
*Attorney, Agent, or Firm*—Cooper & Dunham

[57] ABSTRACT

An optical information recording medium is composed of a substrate, and a recording layer formed on the substrate, the recording layer including (a) a first recording layer, (b) an intermediate, and (b) a second recording layer, which are successively overlaid on the substrate, the first recording layer containing as the main component an organic dye having a peak of spectral reflectivity near the wavelength of a light beam for the recording and reproduction of information, the intermediate layer being transparent to the light beam for recording and reproduction of information, and containing a material having a refractive index smaller than the refractive index of the second recording layer, and the second recording layer containing as the main component an organic dye having a peak of spectral absorbance near the wavelength of the light beam for recording and reproduction of information, and having a thickness by which a maximum reflectivity is exhibited.

10 Claims, 5 Drawing Sheets

OPTICAL INFORMATION RECORDING MEDIUM

BACKGROUND OF THE INVENTION

1. Field of the Invention

The present invention relates to an improved optical information recording medium for use in the field of optical information recording.

2. Description of Background

Up until the present time, a recording layer comprising a metal with a low melting point or a metal with a low melting point and a dielectric material on a substrate have been provided as an optical information recording medium, but these information recording media have such drawbacks as poor storage characteristics, low resolution, low recording density, difficult production conditions, and high cost. Accordingly, recording layers in which an organic dye layer is substituted for the metallic layer have recently been proposed. Because this organic dye layer has the advantages of a low melting point and a low decomposition temperature, as well as a low coefficient of thermal conductivity, a recording layer with high sensitivity and high density is possible, and, in addition, because it is possible to use a coating method to form the layer, high productivity and low cost can be expected. Conventionally, the use of layers of a cyanine dye and a merocyanine dye as the organic dye layer is commonly known. However, in a recording layer fabricated from this type of dye, the absorption maximum wavelength and the reflection maximum wavelength differ. Therefore, the drawback exists that it is not possible to obtain both high sensitivity recording and high contrast reproduction using a simple pick-up.

In order to solve this problem, a recording material from a mixture of a dye with an absorption maximum close to the wavelength of the recording and reproduction beam and a dye with a reflection maximum also close to this wavelength has been proposed in Japanese Laid-Open Patent Applications 1-113288 and 1-178493, to provide both high sensitivity recording and high contrast reproduction.

In addition, from another viewpoint, the provision of a protective layer with a refractive index larger than that of a recording layer has been proposed for application to the recording layer to provide a high reflection coefficient and therefore high contrast reproduction in an optical information recording medium using an organic dye. However, the following problems remain to be solved in the above-mentioned conventional technology. Specifically, because a recording layer comprising a mixture of a dye exhibiting an absorption maximum close to the wavelength of the recording and reproduction beam and a dye with a reflection maximum also close to this wavelength is a mixed system, this results in poor compatibility of the two dyes, leading to the problem that crystallization or defects are produced during storage. This is one possible cause of error generation. In addition, the reflectivity of the recording layer is still not adequate, so a material with a higher reflectivity is required. Also, in the case where a protective layer with a refractive index larger than that of a recording layer is provided, a high reflectivity can be obtained by making the recording layer thin. However, because the protective layer itself has no absorption, the sensitivity is still not sufficiently high.

SUMMARY OF THE INVENTION

Accordingly, an object of the present invention is to provide, with due consideration to the drawbacks of such conventional materials, an optical information recording medium with a high reflectivity, specifically, an optical information recording medium from which it is possible to reproduce information at high contrast, and which can record information with high sensitivity.

The above object of the present invention can be achieved by an information recording medium comprising a substrate and a recording layer formed on the substrate either directly or over an undercoat layer, wherein the recording layer comprises a first recording layer, an intermediate layer, and a second recording layer, successively overlaid on the substrate. The main component of the first recording layer is an organic dye with a peak spectral reflectivity close to the wavelength of an information recording and reproduction beam. The intermediate layer is transparent to the information recording and reproduction beam and is fabricated from a material with a refractive index smaller than that of the second recording layer. The main component of the second recording layer is an organic dye with a peak spectral absorption coefficient close to the wavelength of the information recording and reproduction beam. The recording layer has a layer thickness which provides a maximum reflectivity.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

The present invention will now be explained in detail with reference to the accompanying drawings.

Figure 1:
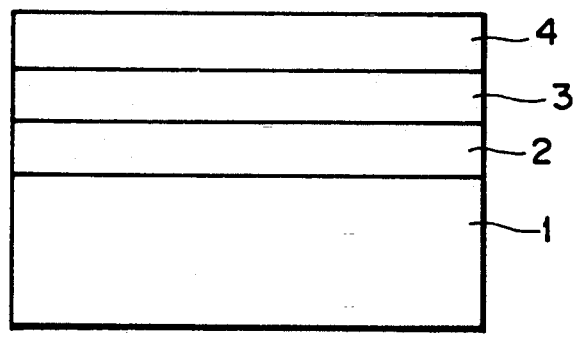
FIG. 1 is a schematic cross-sectional view of the basic structure of an optical information recording medium of the present invention.

FIG. 1 is a schematic cross-sectional view of the basic structure of an optical recording medium of the present invention. This optical recording medium comprises a substrate 1, and a first recording layer 2, an intermediate layer 3, and a second recording layer 4 which are successively overlaid on the substrate 1.

The first recording layer 2 comprises as the main component an organic dye which exhibits a reflection maximum close to the wavelength of a recording and reproduction beam. The intermediate layer 3 is formed from a material which permits passage of the recording and reproduction beam and which has a refractive index smaller than that of the second recording layer 4. The second recording layer 4 comprises as the main component an organic dye which exhibits an absorption maximum close to the wavelength of the information recording and reproduction beam.

Generally, to obtain a recording medium with a high reflectivity, it is most desirable for the recording material to have a high refractive index and a high extinction coefficient. However, with layers of organic dyes, normally the wavelength at which a high extinction coefficient is obtained differs from the wavelength at which a high refractive index is obtained, and the highest refractive index is found at the absorption end of the absorption spectrum. Furthermore, the reflection peak and the absorption peak differ in layers of organic dyes and have wavelengths close to the wavelength at which a high refractive index is obtained. Accordingly, if it is tried to obtain a high refractive index, the extinction coefficient of the layer is small so that a high absorption coefficient is not obtained, therefore the sensitivity does not increase. If a layer with the absorption maximum close to the wavelength of the information recording and reproduction beam is used in an attempt to obtain a high sensitivity, conversely a high refractive index is not obtained.

Figure 2A:
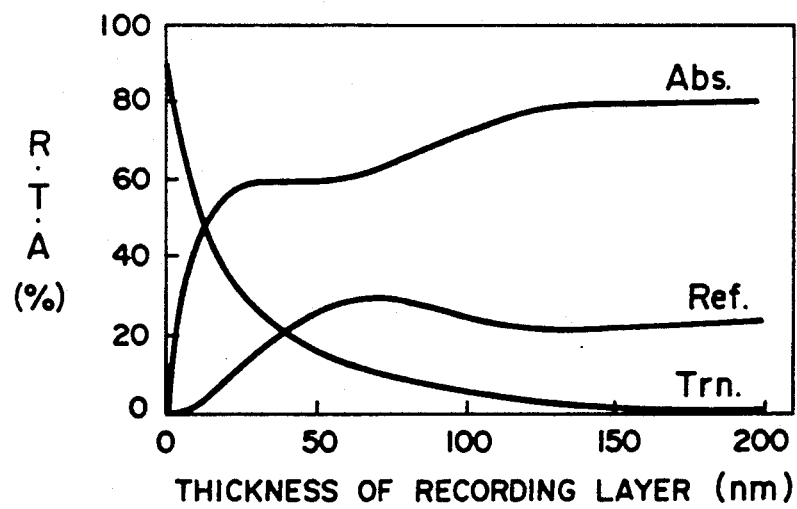
FIG. 2(a) is a graph showing the relationship between a recording layer thickness and the optical characteristics in the case where the recording layer consists of a dye with an absorption peak close to the wavelength of a laser oscillation wave.

FIG. 2(a) is a graph showing the relationship among the optical characteristics, specifically, the reflectivity (R) the transmittance (T), and the absorbance (A), and the recording layer thickness when an optical disk is provided with a recording layer comprising only an organic dye with an absorption peak close to the wavelength of a laser oscillation wave, used as the material for the second recording layer of a later-described first example of the present invention, formed on a polymethyl acrylate substrate 1.2 mm thick with no guide grooves. The substrate has a refractive index of 1.5 and an extinction coefficient of 0. The recording layer has a refractive index of 2.7 and an extinction coefficient of 1.7. As is clearly shown in FIG. 2(a), in this case a high absorbance is obtained but a high reflectivity is not.

Figure 2B:
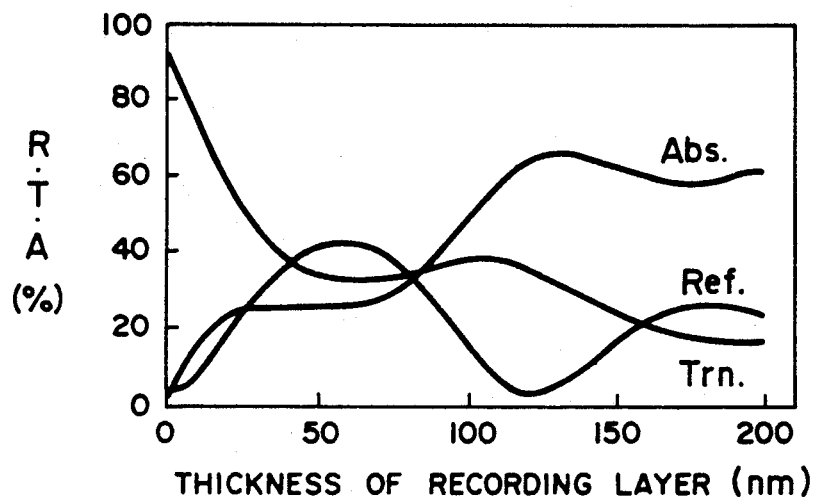
FIG. 2(b) is a graph showing the relationship between a recording layer thickness and the optical characteristics in the case where the recording layer consists of a dye with a reflection peak close to the wavelength of a laser oscillation wave.
Figure 2C:
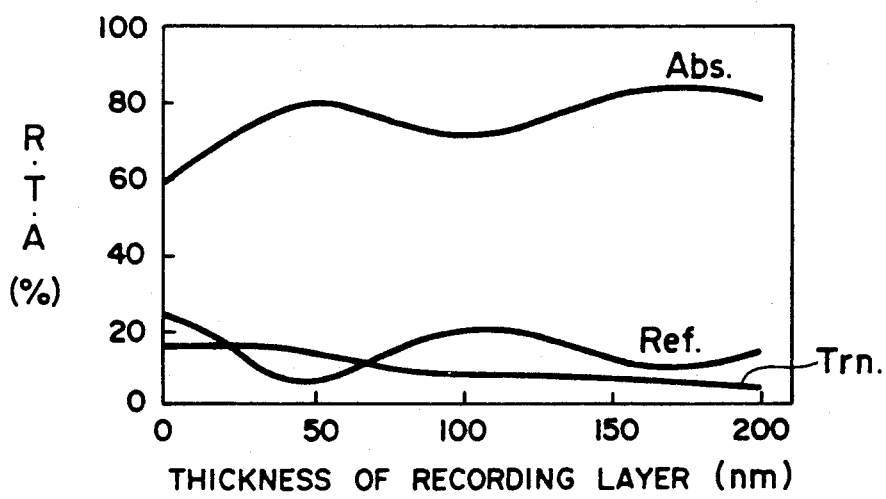
FIG. 2(c) is a graph showing the relationship between the thickness of a first recording layer and the optical characteristics in the case where the recording layer comprises a first recording layer comprising a dye with a reflection peak close to the wavelength of a laser oscillation wave and a second recording layer comprising a dye with an adsorption peak close to the wavelength of the laser oscillation wave, with the second recording layer overlaying the first recording layer.
Figure 3A:
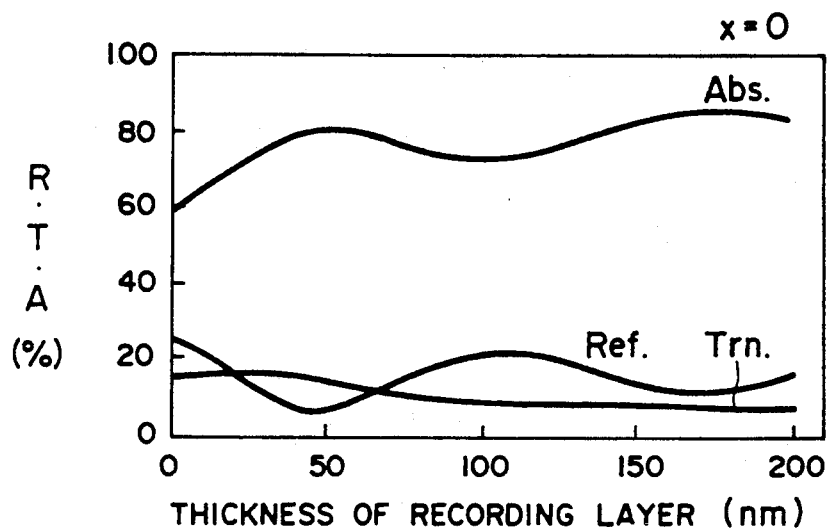
FIG. 3(a) to FIG. 3(f) are graphs showing the relationship between the thickness of a first recording layer and the optical characteristics when the thickness of an intermediate layer, provided between the first recording layer and a second recording layer, is changed.
Figure 3B:
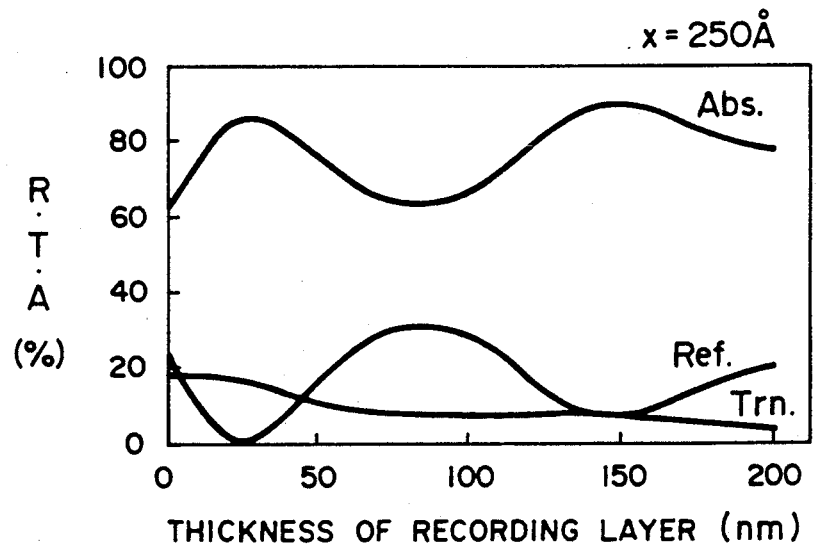
Figure 3C:
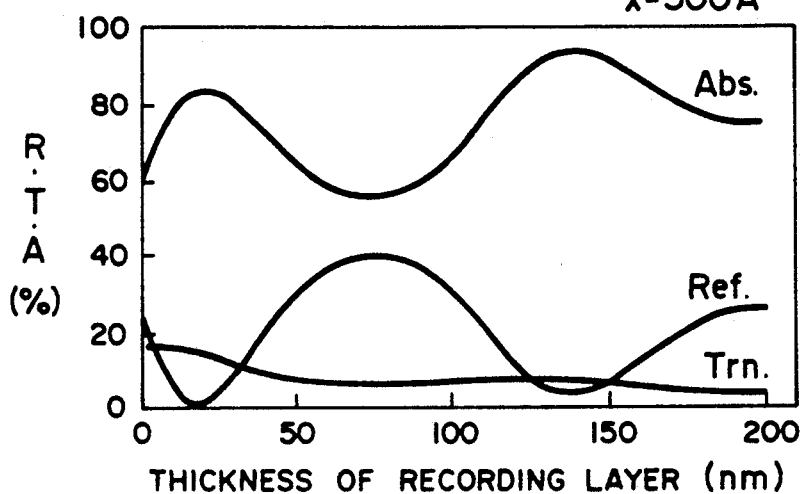
Figure 3D:
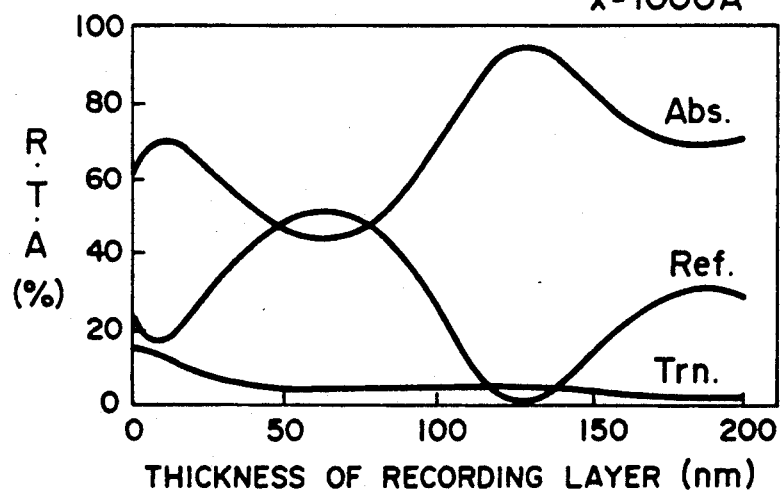
Figure 3E:
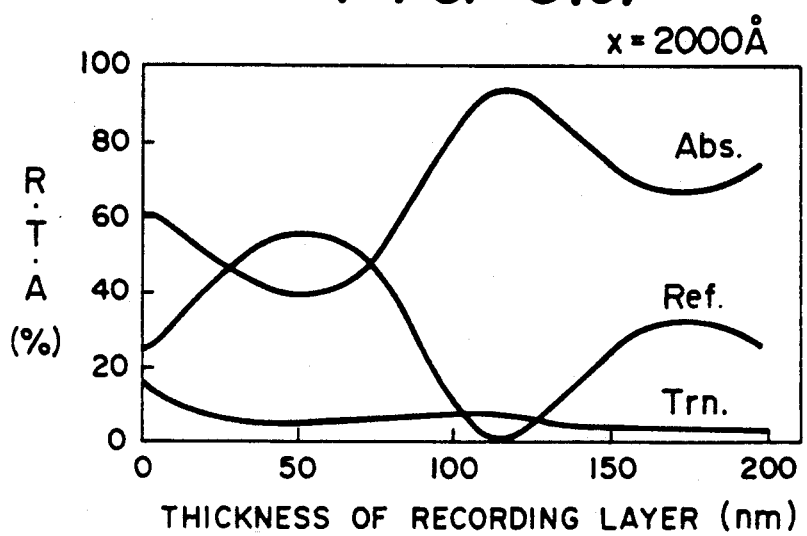
Figure 3F:
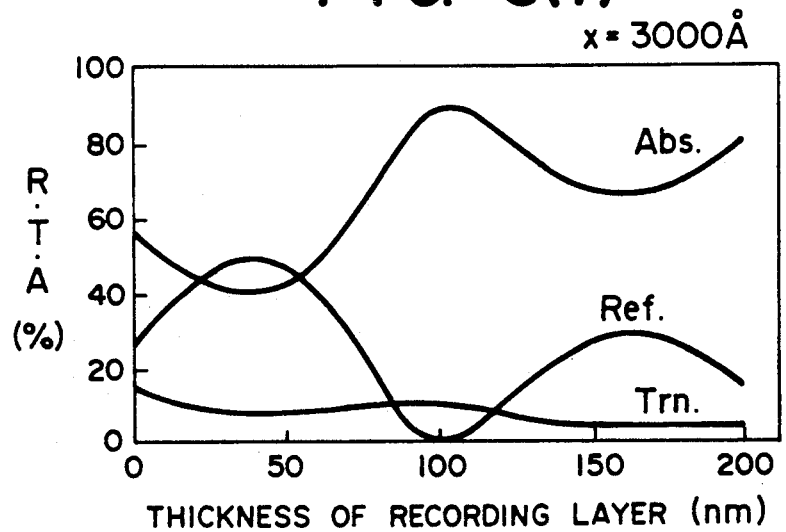

FIG. 2(b) is a graph showing the relationship between the optical characteristics and the recording layer thickness when an optical disk is provided with a recording layer comprising only an organic dye with a reflection peak close to the wavelength of a laser oscillation wave used as the material for the first recording layer of the first example of the present invention, formed in the same manner as in FIG. 2(A). The recording layer has a refractive index of 3.2 and an extinction coefficient of −0.4. As is clearly shown in FIG. 2(b), this case is the reverse of that in FIG. 2(a) inasmuch as a high reflectivity is obtained but a high absorbance is not. Accordingly, the inventors of the present invention experimented with improvements to the recording layer by overlaying a layer comprising a recording material exhibiting the characteristics shown in FIG. 2(b) with a layer comprising a recording material exhibiting the characteristics shown in FIG. 2(a). Specifically, a layer made from the material of the first recording layer was provided on the substrate, then a layer made from the material of the second recording layer was provided on the first recording layer to form an optical disk. The relationship between the optical characteristics and the thickness of the first recording layer at this time is shown in FIG. 2(c). The thickness of the second recording layer was 500Å. As can be seen in FIG. 2(c), a recording material with an extremely high absorbance was obtained, so that high sensitivity was attained, but a high reflectivity was not obtained.

For this reason, the inventors of the present invention proceeded further with this research and discovered that, by interposing between the two recording layers an intermediate layer comprising a material with a refractive index lower than that of the second recording layer and transparent to a recording and reproduction beam, both a high reflectivity and a high absorbance were achieved in the same recording medium.

FIG. 3(a) to FIG. 3(f) are graphs showing the relationship between the thickness of the first recording layer and the optical characteristics when an intermediate layer of a thickness of x (Å) is provided between the two recording layers of a disk with the characteristics shown in FIG. 2(c). As can be understood from these graphs, the reflection and the absorption characteristics are changed by the interposition of the intermediate layer, and when the intermediate layer has a suitable thickness a high reflectivity and a high absorbance are achieved. This is because the interposition of the intermediate layer augments the multiple reflection effect at the interface between the intermediate layer and the second recording layer.

The layer configuration of the optical information recording medium of the present invention is not restricted to the structure shown in FIG. 1. An undercoat layer may be provided between the substrate and the recording layer, or a protective layer may be applied over the recording layer, or both these additional layers may be provided. Next, the necessary characteristics of the materials and the layers making up the optical information recording medium of the present invention will be explained in detail.

(1) Substrate

Characteristics necessary in the substrate include transparency to the laser beam used when recording and reproduction are carried out from the substrate side. This transparency is unnecessary in the case where recording and reproduction are carried out from the recording layer side. Materials used in the substrate can be, for example, a plastic such as polyester, acrylic resin, polyamide, polycarbonate resin, polyolefin resin, phenol resin, epoxy resin, polyamide, and the like; glass, ceramic, or metal, or the like. Guide grooves or guide bits for tracking may be provided on the surface of the substrate, as well as preformatting for address signals and the like.

(2) Undercoat layer

An undercoat layer is used (a) to improve adhesive characteristics, (b) as a barrier against water, gases, and the like, (c) to improve the storage stability of the recording layer, (d) to improve the absorption coefficient, (e) to protect the substrate from solvents, and (f) for forming guide grooves, guide bits, or for preformatting.

To achieve (a), various types of high molecular materials can be used, such as, for example, an ionomer resin, polyamide resin, vinyl-type resin, natural resin, natural high polymers, silicone, liquid rubber, and the like, and a silane coupling agent.

The objects of (b) and (c) can be satisfied by the use of the above-mentioned high molecular materials, and in addition, norganic compounds such as BiO2, MgF2, SiO, TiO2, ZnO, TiN, SiN, and the like, metals or semimetals, such as, for example, Zn, Au, S, Ni, Cr, Ge, Se, Ag, Al, and the like can be used.

For (d) metals such as Al, Ag, Te, and the like, organic thin-layers with metallic brilliance, such as methine dyes, xanthene-type dyes, and the like can be used.

The objects of (e) and (f) can be achieved by the use of ultraviolet curable resins, heat curable resins, thermoplastic resins, and the like.

(3) Recording layer

A recording layer undergoes some type of change by being exposed to a laser beam, and data can be recorded by utilizing this change. Therefore, as previously outlined, in a layer of laminated layers such as a first recording layer, an intermediate layer, and a second recording layer, the first recording layer is formed from an organic dye which exhibits a reflection maximum close to the wavelength of the information recording and reproduction beam, the intermediate layer is permeable to the information recording and reproduction beam and is fabricated from a material with a refractive index smaller than that of the second recording layer, and the second recording layer is formed from an organic dye which exhibits an absorption maximum close to the wavelength of the information recording and reproduction beam.

Examples of the organic dye which can be used in the first and second recording layers are croconium dyes, azulene dyes (pigments), triphenothiazine compounds, phenanthrene derivatives, phthalocyanine compounds, tetrahydrocolline compounds, dioxane compounds and derivatives thereof, anthraquinone derivatives, xanthene dyes, triphenylmethane dyes, squarylium dyes, polymethine dyes such as pyrylium dyes, cyanine dyes, merocyanine dyes, croconium dyes bonded with polymethine, and azulene dyes bonded with polymethine, and the like.

In addition, examples of materials used for the intermediate layer include the polymers and inorganic materials such as BiO$_2$ and MgF$_2$ given as examples for the undercoat layer.

In the recording layers of the present invention, when pigments or dyes other than mentioned above are used, the following dyes can be used in combination in order to improve the recording characteristics and stability: phthalocyanine dyes, tetrahydrocolline dyes, dioxazine dyes, triphenothiazine dyes, phenanthrene dyes, anthraquinone and indanthrene dyes, cyanine dyes including merocyanine dyes, croconium dyes, xanthene dyes, triphenylmethane dyes, pyrylium dyes, squarylium dyes, azulene dyes, and metals or metal compounds, such as In, Sn, Te, Bi, Al, Se, TeO$_2$, SnO, As, Cd, and the like, contained by dispersing, or by laminating.

Furthermore, other materials which may be mixed and dispersed in the recording layers include polymeric materials, and low molecular compounds, for example, organic compounds which absorb light in the range of a wavelength longer than that in the case of the above-mentioned cyanine dyes, such as aminium compounds, imonium compounds, diimonium compounds, and organometallic complex compounds such as bisdithio diketone complexes, and bisphenyldithiol complexes.

The recording layers may also include other additives such as storage-stabilizers such as organometallic complexes, phenol compounds, dispersing agents, flame retardants, lubricants, plasticizers, and the like. The overall layer thickness of the recording layers, as previously outlined, is set at the value where the reflectivity is a maximum at the wavelength used. This value is a function of the complex index of refraction of the recording layer, although it is not readily determined. However, it is about 100 Å to 10 μm, and preferably 200 Å to 2μm. Suitable thicknesses are, for the first recording layer, 100 Å to 2 μm, for the second recording layer, 100 Å to 2 μm, and for the intermediate layer, 100 Å to 0.5 μm. It is preferable that the total thickness of the recording layer satisfy the above upper limit. The recording layers can be formed by vacuum deposition, the CVD method, the sputtering method, and coating methods such as immersion coating, spray coating, spinner coating, blade coating, roller coating, curtain coating, and the like.

(4) Protective layer

The protective layer is used (a) to protect the recording layer from damage, dust, soiling, and the like, (b) to improve the storage stability of the recording layer, (c) to improve the reflectivity, and (d) to improve the sensitivity. The same materials used for the undercoat layer can be used to meet the above objects. The protective layer may be either a single layer or laminations.

In the present invention, as with the recording layers, additional additives which are suitable for inclusion in the undercoat layer and the protective layer may be, for example, stabilizers, dispersing agents, flame retardants, lubricants, antistatic agents, surfactants, plasticizers, and the like.

The present invention will now be explained in more detail with reference to the following examples, which are given for illustration of the invention only and are not intended to be limiting thereof.

EXAMPLE 1

A substrate was prepared by providing on a polymethyl methacrylate plate 1.2 mm thick and 130 mm in diameter a spiral guide groove by use of an acrylic photopolymer, with a depth of 900 Å, a half value width of 0.4 μm, and a pitch of 1.6 μm.

A 1,2-dichloroethane solution of a dye represented by the following structural formula (I) was applied by the spinner coating method to the substrate to a depth of 500 Å as a first recording layer.

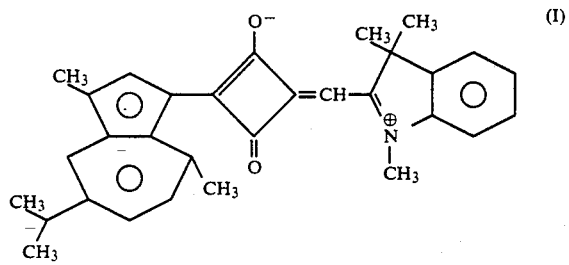

A hexane solution of a petroleum resin, commercially available under the product name C-11X, manufactured by Mitsui Petrochemical Industries, Ltd., was applied by the spinner coating method to the first recording layer to a thickness of 700 Å as an intermediate layer.

On the intermediate layer, an alcohol solution of a dye represented by the following structural formula (II) was applied by the spinner coating method to a thickness of 500 Å as a second recording layer, whereby an optical information recording medium No. 1 according to the present invention was prepared.

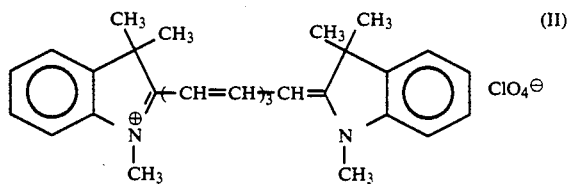

EXAMPLE 2

The same substrate as used in Example 1 was prepared. To this substrate, a 1,2-dichloroethane solution of a dye represented by the following structural formula (III) was applied by the spinner coating method to a depth of 600 Å as a first recording layer.

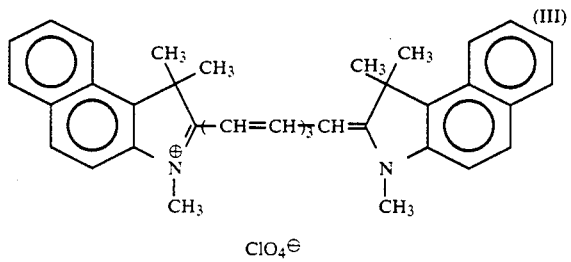

A carbon tetrachloride solution of a vinyl chloride-vinyl acetate copolymer, commercially available under the product name EU-40, manufactured by Mitsui Polychemical Co., was applied to the first recording layer to a thickness of 500 Å as an intermediate layer.

On the intermediate layer, a dye represented by the following structural formula (IV) was applied by vacuum deposition to a thickness of 600 Å as a second recording layer, whereby an optical information recording medium No. 2 according to the present invention was prepared.

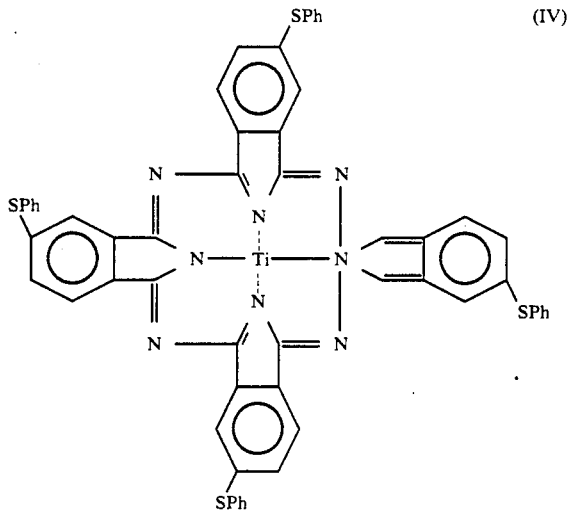

COMPARATIVE EXAMPLE 1

To the same substrate as prepared in Example 1, only the dye represented by formula (III) was applied, to a thickness of 600 Å, as a recording layer, whereby a comparative optical information recording medium No. 1 was prepared.

COMPARATIVE EXAMPLE 2

To the same substrate as prepared in Example 1, only the dye represented by formula (I) was applied, to a thickness of 700 Å as a recording layer, whereby a comparative optical information recording medium No. 2 was prepared.

COMPARATIVE EXAMPLE 3

To the same substrate as prepared in Example 1, a 1:1 mixture of the dye represented by formula (I) and the dye represented by formula (II) only was applied, to a thickness of 650 Å as a recording layer, whereby a comparative optical information recording medium No. 3 was prepared.

COMPARATIVE EXAMPLE 4

The procedure for Example 2 was repeated except that the recording layer employed in Example 2 was replaced by a recording layer consisting of only the first recording layer with a thickness of 600 Å and the intermediate layer with a thickness of 500 Å, whereby a comparative optical information recording medium No. 4 was prepared.

COMPARATIVE EXAMPLE 5

The procedure for Example 2 was repeated except that the recording layer employed in Example 2 was replaced by a recording layer consisting of only the dye of formula (III) with a thickness of 1200 Å, whereby a comparative optical information recording medium No. 5 was prepared.

Each of the optical information recording media prepared in the manner outlined above was rotated at a linear speed of 2.1 m/sec and a laser beam of 790 nm wavelength was applied from the substrate side. The laser beam diameter was about 1.3 $\mu$m for write-in at this time. Recording was carried out at a fundamental frequency of 1.25 MHz, whereby an appropriate recording power at this time was obtained. The recorded information was then reproduced, a spectral analysis was performed on the reproduction wave form, and the C/N ratio was measured. The contrast (reflectivity) was also measured. The results of the above measurements are shown in the following TABLE 1. The above-mentioned appropriate recording power means the recording power at which the eye center is positioned at 50% when a random pattern was recorded.

TABLE 1

|  | Reflectivity (%) | Recording Power (mW) | C/N (dB) |
| --- | --- | --- | --- |
| Ex. 1 | 43 | 3.0 | 53 |
| Ex. 2 | 32 | 3.2 | 50 |
| Comp. Ex. 1 | 41 | 4.2 | 52 |
| Comp. Ex. 2 | 28 | 2.8 | 53 |
| Comp. Ex. 3 | 29 | 3.0 | 53 |
| Comp. Ex. 4 | 21 | 5.5 | 44 |
| Comp. | 23 | 3.3 | 50 |

TABLE 1-continued

| | Reflectivity (%) | Recording Power (mW) | C/N (dB) |
|---|---|---|---|
| Ex. 5 | | | |

By means of the present invention with the structure as outlined above, a high reflectivity is obtained, reproduction of information or data at high contrast is possible, and both high contrast reproduction and high sensitivity recording are achieved in the same recording medium.

What is claimed is:

1. An optical information recording medium comprising a substrate, and a recording layer laminate formed on said substrate, said recording layer laminate comprising:

(a) a first recording layer;
   (b) an intermediate layer, and
   (c) a second recording layer, said first recording layer, said intermediate layer, and said second recording layer being successively overlaid on said substrate, said first recording layer consisting essentially of an organic dye having a peak of spectral reflectivity near the wavelength of a light beam for the recording and reproduction of information, said intermediate layer being transparent to said light beam for recording and reproduction of information, and comprising a material having a refractive index smaller than the refractive index of said second recording layer, said intermediate layer having a thickness selected so that a multiple reflection effect is increased at the interface between the intermediate layer and the second recording layer, and said second recording layer consisting essentially of an organic dye having a peak of spectral absorbance near the wavelength of said light beam for recording and reproduction of information, and having a thickness by which a maximum reflectivity is exhibited.

2. The optical information recording medium as claimed in claim 1, further comprising an undercoat layer between said substrate and said recording layer laminate.

3. The optical information recording medium as claimed in claim 1, wherein said organic dye for use in said first recording layer and said second recording layer is selected from the group consisting of croconium dyes, azulene dyes, triphenothiazine compounds, phenanthrene derivatives, phthalocyanine compounds, tetrahydrocolline compounds, dioxane compounds, anthraquinone derivatives, xanthene dyes, triphenylmethane dyes, squarylium dyes, polymethine dyes, croconium dyes bonded with polymethine, and azulene dyes bonded with polymethine.

4. The optical information recording medium as claimed in claim 1, wherein said recording layer laminate further comprises a metal selected from the group consisting of In, Sn, Te, Bi, Al, Se, $TeO_2$, SnO, As, and Cd.

5. The optical information recording medium as claimed in claim 1, wherein said recording layer laminate further comprises a metal compound selected from the group consisting of $TeO_2$, and SnO.

6. The optical information recording medium as claimed in claim 1, wherein said recording layer laminate further comprises an organic compound which absorbs light in the range of a wavelength longer than that for a cyanine dye.

7. The optical information recording medium as claimed in claim 6, wherein said organic compound is selected from the group consisting of aminium compounds, imonium compounds, and diimonium compounds.

8. The optical information recording medium as claimed in claim 1, wherein said recording layer laminate further comprises an organometallic complex compound selected from the group consisting of bisdithio diketone complexes, and bisphenyldithiol complexes.

9. The optical information recording medium as claimed in claim 1, wherein said first recording layer has a thickness of 100 Å to 2 μm, said second recording layer has a thickness of 100 Å to 2 μm, and said intermediate layer has a thickness of 100 Å to 0.5 μm, and said recording layer laminate has a thickness less than 10 μm.

10. The optical information recording medium as claimed, in claim 1, further comprising a protective layer, which is provided on said recording layer laminate.

* * * * *